United States Patent [19]

Hibbard

[11] 3,822,040
[45] July 2, 1974

[54] AERIAL SPRAY NOZZLE ASSEMBLY
[76] Inventor: Horace E. Hibbard, 630 N. 7th St., Payette, Idaho 83661
[22] Filed: May 22, 1973
[21] Appl. No.: 362,827

[52] U.S. Cl. ............... 239/86, 239/533, 239/171, 239/553, 239/575
[51] Int. Cl. ............... B05b 17/02, B05b 1/30
[58] Field of Search ....... 239/86, 64, 533, 571, 171, 239/574, 575, 583, 584, 551

[56] References Cited
UNITED STATES PATENTS

| | | | |
|---|---|---|---|
| 1,786,844 | 12/1930 | Hesselman | 239/553 X |
| 1,990,875 | 2/1935 | Mock | 239/86 |
| 2,620,233 | 12/1952 | Brown | 239/575 X |
| 2,639,194 | 5/1953 | Wahlin | 239/575 X |
| 3,106,937 | 10/1963 | Sands | 239/533 X |
| 3,447,755 | 6/1969 | Cartwright | 239/551 |
| 3,684,177 | 8/1972 | Barlow | 239/171 |

*Primary Examiner*—Robert S. Ward, Jr.
*Attorney, Agent, or Firm*—Clarence A. O'Brien; Harvey B. Jacobson

[57] ABSTRACT

An aerial spray nozzle assembly is provided which includes a fluid pressure responsive valve for discouraging dripping of fluid from the nozzle when the fluid supply is shut off while in flight and a manual rotary valve associated with the spray nozzle body to provide a secondary seal against fluid leakage when rotated to the closed position.

9 Claims, 4 Drawing Figures

PATENTED JUL 2 1974   3,822,040

AERIAL SPRAY NOZZLE ASSEMBLY

BACKGROUND OF THE INVENTION

The present invention is generally related to fluid handling valves and, more particularly, to an improved nozzle assembly with means for preventing the leakage of fluid from the nozzle subsequent to spraying.

In the past, various spray nozzles have been provided which were particularly adapted to the dispensing of fluids from aircraft. Most aerial dispensing systems operate on fluid pressure and are provided with some sort of pressure shut-off control which is operated by the aircraft pilot. Fluid in the piping between the shut-off control and the nozzle often tends to drip or leak through the nozzle after shut off of the fluid supply. In some cases, this dripping is encouraged by vacuum conditions present at the nozzle openings which tend to suck out any fluid remaining in the pipes after shut off.

In an attempt to overcome this problem, many nozzle assemblies have been provided with pressure responsive valves mounted immediately adjacent the spray nozzle. When the fluid pressure in the pipes was reduced by way of the main shut-off control, a diaphragm, or the like, closed the fluid passage leading to the nozzle to prevent leakage of the spraying fluid. Such arrangements, however, have met with only marginal acceptance, as they are limited in the amount of sealing pressure which they can provide, whereby some drippage still occurs after the pressure responsive valve is closed. This drippage continues at a slow rate until the pipes leading to the main pressure control are completely empty. Usually, this leakage occurs on the ground after the aircraft has returned from a spraying operation, and such results in the loss of a considerable amount of spray fluid which drips to the ground causing an undersirable and unslightly mess.

It is an object of the present invention to provide a novel spray valve assembly which overcomes the above-mentioned shortcomings.

Another object of the present invention is to provide a versatile aerial spray nozzle assembly which includes a dual valve arrangement to provide a double seal which assures against the leakage of fluid from the nozzle subsequent to spraying.

It is a further object of the present invention to provide a unique spray nozzle assembly which includes a rotary valve arrangement for positively sealing the fluid pipes leading to the nozzle against leakage subsequent to each spraying flight.

Still another object of the present invention is to provide a novel aerial spray nozzle assembly including a rotary valve which is incorporated into a spray nozzle body and is opened and closed by selective rotation of the valve body.

It is a further object of the present invention to provide a versatile aerial spray nozzle assembly which includes both pressure responsive and manual shut-off valves, and which is of relatively simple construction which is durable, long-lasting and economical to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 4:
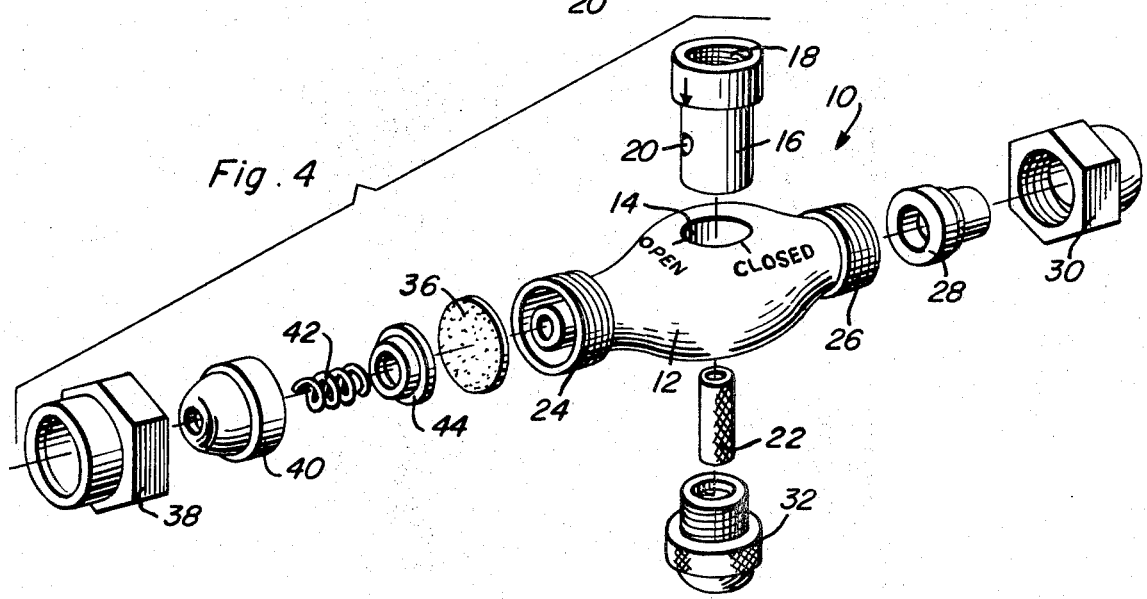
FIG. 4 is an exploded perspective view of the spray nozzle assembly of the present invention.

Referring now, more particularly, to FIG. 4 of the drawings, the aerial spray nozzle assembly of the present invention is generally indicated by the numeral 10 and includes a body member 12 with a bore 14 therein adapted to rotatably receive a valve member 16 of tubular configuration. Valve member 16 is provided with an inlet fitting with threads indicated at 18 adapted to receive a pipe or section of tubing, as shown at 19 in FIG. 1, connected to the aircraft's fluid supply. Under normal operating conditions, fluid flows through valve member 16 and exits through a radial port 20 in the side wall of the valve member. A tubular filter element 22 is disposed within the confines of valve member 16 such that the fluid flows therethrough, whereby contaminants are removed.

A fluid pressure responsive switch mechanism is adapted to be threadedly connected to one end of body member 12 as indicated at threaded portion 24. The opposite end of body member 12 is provided with a similar set of threads 26 which serve for fastening a spray nozzle member 28 in place, by way of a bushing or sleeve 30.

Figure 1:
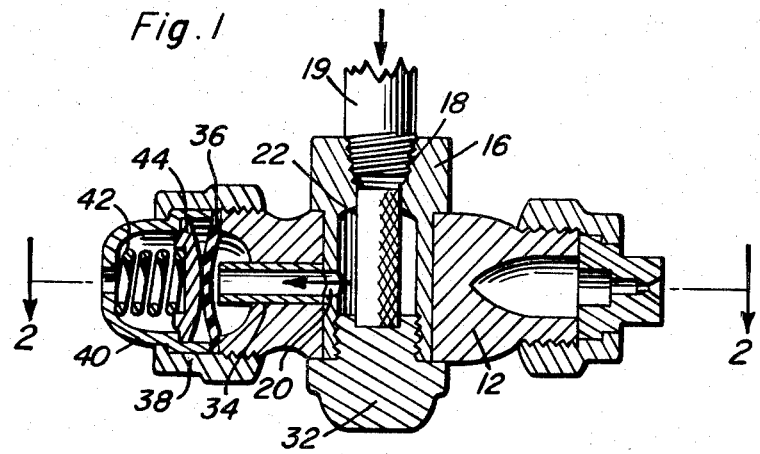
FIG. 1 is a longitudinal sectional view of the spray nozzle assembly of the present invention with the rotaty and pressure responsive valves in open positions.

Referring more particularly to FIG. 1 of the drawings, it will be appreciated that tubular valve member 16 is held in place in the bore of body member 12 by way of a threaded nut 32 or similar fastening means. Filter element 22 is disposed within a filter chamber defined by tubular member 16 with the lower end of the filter element abutting nut 32 to provide a seal thereat. The upper end of the filter element is in communication with the inlet fitting to receive fluid therefrom.

Body member 12 is provided with a fluid tube 34 which, in part, defines a fluid passageway which handles fluid flow from a port 20. With fluid tube 34 in general alignment with port 20, fluid pressure from the supply pressure source acts against a flexible diaphragm 36 with peripheral edge portions held against one end of body member 12 by way of bushing 38. A stationary spring seat 40 is provided with a shoulder portion which is engaged by bushing 38 to influence the spring seat against the peripheral edge portions of diaphragm 36. A coil compression spring 42 is disposed between stationary spring seat 40 and a movable spring seat member 44 which engages diaphragm 36. Under appropriate fluid pressure conditions, diaphragm 36 is flexed away from the opening of fluid tube 34 against the bias of spring 42. When the fluid pressure is reduced to a predetermined level by way of a main shut-off or control, preferably operated by the aircraft pilot, spring 42 is effective to influence diaphragm 36 against the opening of fluid 34 to form at least a partial seal thereat. This arrangement is similar to that provided by conventional devices.

Figure 2:
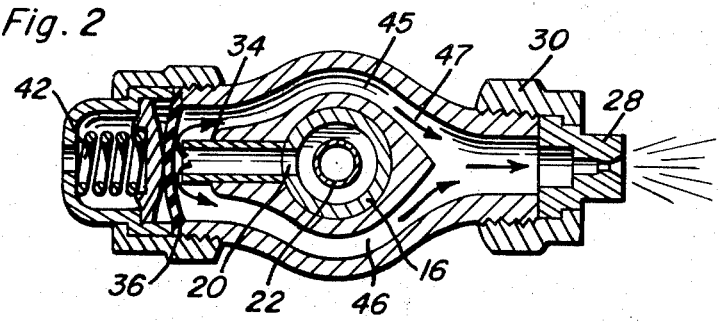
FIG. 2 is a sectional view taken along section 2—2 of FIG. 1.

Referring more particularly to FIG. 2, it will be observed that when the fluid pressure is sufficient to flex diaphragm 36 to an open position fluid flows through passageways 45 and 46 formed in body member 12.

This is indicated by the arrows at 47. The fluid exits from passageways 45 and 46 into spray nozzle member 28 and is dispensed therefrom in the form of a spray mist appropriate for spraying crops, or the like.

Figure 3:
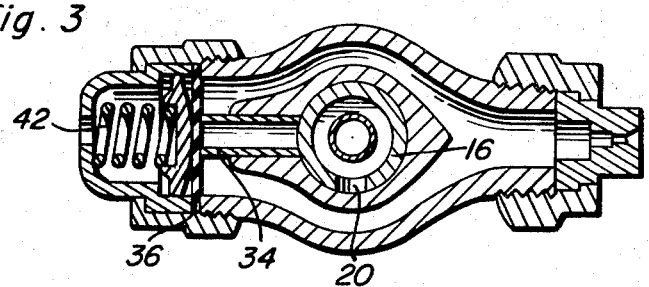
FIG. 3 is a sectional view similar to FIG. 2, but with the rotary and pressure responsive valves in closed positions.

As mentioned above, when the fluid pressure reaches a predetermined low level, diaphragm 36 is influenced against the opening of fluid tube 34 to form a seal thereat. This position of the disphragm is best illustrated in FIG. 3. As also pointed out above, subsequent to shut off of the fluid pressure, in many systems, a considerable amount of residue fluid remains in the pipes or tubing between the main shutoff control and the spray nozzle. The pressure head generated by this residue of fluid and various other factors, such as aircraft vibrations caused in many cases seepage of the fluid past the diaphragm, which continued until the residue of fluid was drained from the piping. It will be appreciated, that the spray nozzle assembly of the present invention is such that the main body 12 is rotatable relative to tubular valve member 16. Relative rotation between the two may be effected to cause misalignment of the fluid port 20 and fluid tube 34 to form a secondary seal therebetween. This seal, coupled with the partial seal provided by diaphragm 36 assures against any leakage of fluid after shutoff.

The manual rotary valve is illustrated in the closed position in FIG. 3. Preferably, relative rotation between valve member 16 and main body 12 is brought about by manual rotation of the main body, with valve member 16 remaining stationary and fixed to the associated inlet pipe or tube. Subsequent to a spraying operation, each of the main valve bodies may be rotated with the aircraft on the ground. If desired, however, such rotation may be implemented before landing by way of an appropriate mechanism which is operable by the aircraft pilot while in flight.

From the foregoing description, it will be appreciated that the aerial spray nozzle assembly of the present invention is of relatively simple construction including a minimum number of moving parts. The main body of the assembly both supports the spray nozzle and serves as a means of opening and closing the rotary valve member. It will also be appreciated that disassembly may be made with a minimum amount of effort, whereby the removal of nut 32 permits disassociation of the main body 12 from valve member 16 for replacement or cleaning of filter element 22 or for routine maintenance or repair purposes. It is not intended that the spray nozzle assembly of the present invention be limited to the exact filter location or configuration illustrated in the drawings, nor to the fluid passageway configuration illustrated. Various types of filter elements may be utilized and the fluid passageway arrangement may be modified, if so desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An aerial spray nozzle assembly comprising a body member with a fluid passageway therein extending between inlet and outlet openings, fluid pressure responsive valve means between said inlet and outlet openings for effecting closure of said fluid passageway in response to predetermined minimum fluid pressure conditions, and manual valve means associated with said body member including a tubular valve member having a radial port therein, said valve member being rotatable between open and closed positions with respect to said inlet opening, a bore within said body member intersecting said inlet opening of said fluid passageway, whereby said port is in fluid communication with said inlet opening in said open position and said port is sealed from said inlet opening in said closed position to prevent drippage.

2. The structure set forth in claim 1 wherein spray nozzle means are positioned adjacent said outlet opening.

3. An aerial spray nozzle assembly comprising a body member with a fluid passageway therein extending between inlet and outlet openings, fluid pressure responsive valve means between said inlet and outlet openings for effecting closure of said fluid passageway in response to predetermined minimum fluid pressure conditions, and manual valve means associated with said body member for selectively sealing said inlet opening to prevent the flow of fluid to said fluid passageway, said manual valve means including a valve member rotatably mounted to said body member, said valve member including an inlet port, said valve member and body member being relatively rotatable about an axis between an open position wherein said inlet port is in fluid communication with said inlet opening and a closed position wherein said inlet port is sealed from said inlet opening, said valve member being of generally tubular construction, said inlet port extending through a wall of said tubular valve member and being in general alignment with said inlet opening when said valve member is in said open position, the interior of said tubular valve member defining a filter chamber with filter means disposed therein for filtering the fluid before it passes to said inlet port.

4. The structure set forth in claim 3 wherein said filter means includes a tubular filter element with one axial end sealed and an opposite axial end open and in fluid communication with a fluid supply line associated with said valve member.

5. An aerial spray nozzle assembly comprising a body member with a fluid passageway therein extending between inlet and outlet openings, a spray nozzle connected to said body member at said outlet opening, a bore in said body member intersecting said inlet of said fluid passageway, a tubular valve element including a radial fluid port, said valve element being rotatably mounted in said bore for rotation relative to said body member between an open position wherein said port is in fluid communication with said inlet opening and a closed position wherein said port is sealed from said inlet opening to prevent the flow of fluid thereto.

6. The structure set forth in claim 5 wherein said tubular valve element is sealed at one end and is attached to and in fluid communication with an inlet pipe at the opposite end.

7. The structure set forth in claim 6 wherein said tubular valve element is stationary, said body member being selectively rotatable about said tubular valve element to effect opening and closing thereof.

8. The structure set forth in claim 7 wherein the interior of said tubular valve element defines a filter chamber with a tubular filter therein extending between said one end and said open end of said valve element.

9. The structure set forth in claim 7 wherein said inlet pipe is attached to an aircraft to supply fluid to said nozzle element, rotation of said body member to said closed position sealing said fluid passageway from said inlet pipe to prevent the drippage of fluid from said nozzle element.

* * * * *